E. L. Molineux,
Dyeing
No. 78,313. Patented May 26, 1868.
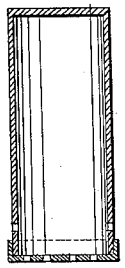
Witnesses.
Charles Lillie
Wm K Crook Jr
Inventor.
Edward L. Molineux

UNITED STATES PATENT OFFICE.

EDWARD L. MOLINEUX, OF NEW YORK, N. Y.

IMPROVED ARTICLE OF BLUING.

Specification forming part of Letters Patent No. 78,313, dated May 26, 1868.

*To all whom it may concern:*

Be it known that I, EDWARD L. MOLINEUX, of the city, county, and State of New York, have invented a new and useful Improvement in Packing Laundry-Bluing for sale, transportation, and use; and I do hereby declare that the following is a full, clear, and exact description thereof, which will enable others skilled in the art to make and use the same, reference being had to the accompanying drawing, forming a part of this specification.

This invention relates to a new method of packing or putting up soluble laundry-bluing in the lump, for sale, transportation, and use; and it consists in packing the soluble lump bluing in boxes, made of any suitable material, as metal, wood, glass, or paper, with either the top, bottom, or sides of such boxes perforated with holes, so that when the box is immersed in water or other liquid the liquid can enter the holes and come in contact with the bluing, and so that when the box is held above the water or liquid such liquid as entered will filter from the box through the perforations, and impart the desired color to the water or liquid.

The drawing represents a box constructed according to my invention.

The box may be made of any size and shape, and of any suitable material.

This invention applies only to soluble bluing in lump, pressed, or molded form; and instead of the perforations being made through the box, wire-gauze or perforated metal may be used for any part of the box.

The bluing being in the lump form, the box can be used for dyeing the water or liquid, as before stated, and neither in the sale nor transportation is it necessary to close the holes or perforations through the box in any manner.

The use of bluing put up in this way is preferable to either liquid or powdered bluing, as no dust can rise from it. This lump or pressed bluing can be used otherwise only by means of a bag, which soon wears out, and is inconvenient for transportation.

My perforated box affords the most ready and convenient means for transporting, keeping, and using soluble laundry-bluing in the lump form.

When only one end or side is filled with holes, as shown in the drawings, there should be one or more vent-holes, as shown in the sides in the annexed drawing. When two or more sides are perforated, the vent-holes are not necessary.

Having thus described my invention, what I claim as new, and desire to secure by Letters Patent, is—

Packing laundry-bluing, when in lump or pressed, for transportation and use, in perforated boxes, substantially as described.

The above specification of my invention signed by me this 13th day of April, 1868.

EDWARD L. MOLINEUX.

Witnesses:
CHARLES LILLIE,
WM. H. CRONK, Jr.